US012607727B2

(12) United States Patent
Buscaino et al.

(10) Patent No.: US 12,607,727 B2
(45) Date of Patent: Apr. 21, 2026

(54) METHOD AND APPARATUS FOR DETECTING AND/OR IDENTIFYING OBJECTS

(71) Applicant: CIENA CORPORATION, Hanover, MD (US)

(72) Inventors: Brandon Taylor Buscaino, Palo Alto, CA (US); Mohammad Ebrahim Mousa Pasandi, Ottawa (CA); Kim Byron Roberts, Ottawa (CA)

(73) Assignee: CIENA CORPORATION, Hanover, MD (US)

( * ) Notice: Subject to any disclaimer, the term of this patent is extended or adjusted under 35 U.S.C. 154(b) by 448 days.

(21) Appl. No.: 18/313,885

(22) Filed: May 8, 2023

(65) Prior Publication Data

US 2024/0159882 A1 May 16, 2024

Related U.S. Application Data

(60) Provisional application No. 63/425,502, filed on Nov. 15, 2022.

(51) Int. Cl.
*G01S 7/493* (2006.01)
(52) U.S. Cl.
CPC .................................... *G01S 7/493* (2013.01)
(58) Field of Classification Search
CPC ...................................................... G01S 7/493
See application file for complete search history.

(56) References Cited

U.S. PATENT DOCUMENTS 6,714,286 B1    3/2004 Wheel
9,571,205 B1 *  2/2017 Suarez .................... G02F 1/225
(Continued)

OTHER PUBLICATIONS

Adany, Peter , et al., "Chirped Lidar Using Simplified Homodyne Detection", Journal of Lightwave Technology, vol. 27, No. 16,, Aug. 15, 2009, 7 Pages.

(Continued)

*Primary Examiner* — Seung C Sohn
(74) *Attorney, Agent, or Firm* — Guntin & Gust, PLC; Kenneth S. Kwan

(57) ABSTRACT

Aspects of the subject disclosure may include, for example, creating a first sequence of optical signals based on a first sequence of electrical signals, the first sequence of electrical signals associated with a plurality of matched filters, directing the first sequence of optical signals to a plurality of objects, receiving a second sequence of optical signals based on a reflection of the first sequence of optical signals on the plurality of objects, converting the second sequence optical signals into a second sequence of electrical signals, processing the second sequence of electrical signals according to the plurality of matched filters to extract information associated with the plurality of objects, adjusting the first sequence of electrical signals to a third sequence of electrical signals, adjusting the plurality of matched filters according to the third sequence of electrical signals, generating from the third sequence of the electrical signals an adjusted sequence of optical signals, and directing the adjusted sequence of optical signals to further refine the extract information associated with the plurality of objects. Other embodiments are disclosed.

22 Claims, 11 Drawing Sheets

(56)                    References Cited

U.S. PATENT DOCUMENTS

| | | | |
|---|---|---|---|
| 2013/0033964 A1* | 2/2013 | Karl | G01S 15/10 |
| | | | 367/100 |
| 2019/0265359 A1 | 8/2019 | Datta et al. | |
| 2020/0132847 A1 | 4/2020 | Hillard et al. | |

OTHER PUBLICATIONS

Banzhaf, Sebastian , et al., "Phase-Code-Based Modulation for Coherent Lidar", IEEE Transactions on Vehicular Technology, vol. 70, No. 10, Oct. 2021, 12 Pages.

Chen, Jun-Da , et al., "3-D Multi-Input Multi-Output (MIMO) Pulsed Chaos Lidar Based on Time-Division Multiplexing", IEEE Journal of Selected Topics in Quantum Electronics, vol. 28, No. 5,, Sep./Oct. 2022, 9 Pages.

Fersch, Thomas , et al., "A CDMA Modulation Technique for Automotive Time-of-Flight LiDAR Systems", IEEE Sensors Journal, vol. 17, No. 11, Jun. 1, 2017, 10 Pages.

Gao, Hongbo , et al., "Object Classification Using CNN-Based Fusion of Vision and LIDAR in Autonomous Vehicle Environment", IEEE Transactions on Industrial Informatics, vol. 14, No. 9, Sep. 2018, 8 Pages.

Hsu, Ching-Pai , et al., "A Review and Perspective on Optical Phased Array for Automotive LiDAR", IEEE Journal of Selected Topics in Quantum Electronics, vol. 27, No. 1, Jan./Feb. 2021, 16 Pages.

Royo, Santiago , et al., "An Overview of Lidar Imaging Systems for Autonomous Vehicles", Appl. Sci. 2019, 9, 4093; doi:10.3390/app9194093, Sep. 30, 2019, 37 Pages.

Spollard, James T., et al., "Mitigation of phase noise and Doppler-induced frequency offsets in coherent random amplitude modulated continuous-wave LiDAR", https://doi.org/10.1364/OE.416128, Mar. 9, 2021, 24 Pages.

Yu, Yang , et al., "Improving the Performance of Pseudo-Random Single-Photon Counting Ranging Lidar", www.mdpi.com/journal/sensors, Aug. 20, 2019, 13 Pages.

Zhao, Lili , et al., "Real-Time LiDAR Point Cloud Compression Using Bi-Directional Prediction and Range-Adaptive Floating-Point Coding", IEEE Transactions on Broadcasting, vol. 68, No. 3, Sep. 2022, 16 Pages.

"Amendment Under Article 34/Response to Written Opinion for PCT/US2023/079109", filed Jul. 18, 2024, 11 Pages.

"PCT/US2023/079109 International Search Report & Written Opinion".

* cited by examiner

METHOD AND APPARATUS FOR DETECTING AND/OR IDENTIFYING OBJECTS

CROSS REFERENCE TO RELATED APPLICATIONS

This application claims priority to U.S. Patent Application Ser. No. 63/425,502 filed on Nov. 15, 2022. All sections of the aforementioned application are incorporated herein by reference in their entirety.

FIELD OF THE DISCLOSURE

The subject disclosure relates to a method and apparatus for detecting and/or identifying objects.

BACKGROUND

Light detection and ranging (LiDAR) is a technique whereby an optical signal, typically in the infrared, is transmitted into a medium and the reflected light is captured and used to determine features of the medium. In the most common example, light is sent into free-space (air) and the reflected light is captured to determine the distance to a reflecting object. In some implementations it is possible to also recover the velocity of the detected object.

Depending on the application, the requirements on ranging and velocity detection can be significantly different. For example, LiDAR is frequently used for aerial topographical mapping (Secord, J. and Zakhor, A., 2007. Tree detection in urban regions using aerial lidar and image data. IEEE Geoscience and Remote Sensing Letters, 4(2), pp. 196-200.), where ranging resolutions below 1 m are sufficient, though the ranging occurs over distances of up to 10 km. For automotive applications, resolutions of 1 cm are acceptable, with typical maximum distances of 300 m (Royo, S. and Ballesta-Garcia, M., 2019. An overview of lidar imaging systems for autonomous vehicles. Applied sciences, 9(19), p. 4093.). LiDAR can also be used for precision metrology, akin to a known medical imaging technique called optical coherence tomography. In these cases, resolutions of 10 um are desired (Shimizu, Y., Chen, L. C., Kim, D. W., Chen, X., Li, X. and Matsukuma, H., 2021. An insight into optical metrology in manufacturing. Measurement Science and Technology, 32(4), p. 042003.). In many of these cases, the resolution and range depend on the signal-to-noise ratio (SNR), which can often be increased by increasing the transmitted laser power, within eye and skin safety limits.

FIG. 1 shows a list of various classifications of LiDAR techniques. In scanning LiDAR, a mechanical or non-mechanical steering element directs light to various points in a scene, called the point cloud, where ranging and velocity information is obtained in point-wise fashion. In non-scanning (flash) LiDAR, the entire scene is illuminated with light, and then a multi-pixel detector is used to back out information from the scene. In many implementations, scanning LiDAR is also used with a multi-element detector array. In addition to various scanning methods, transmission and detection methods vary.

BRIEF DESCRIPTION OF THE DRAWINGS

Reference will now be made to the accompanying drawings, which are not necessarily drawn to scale, and wherein:

Figure 9:
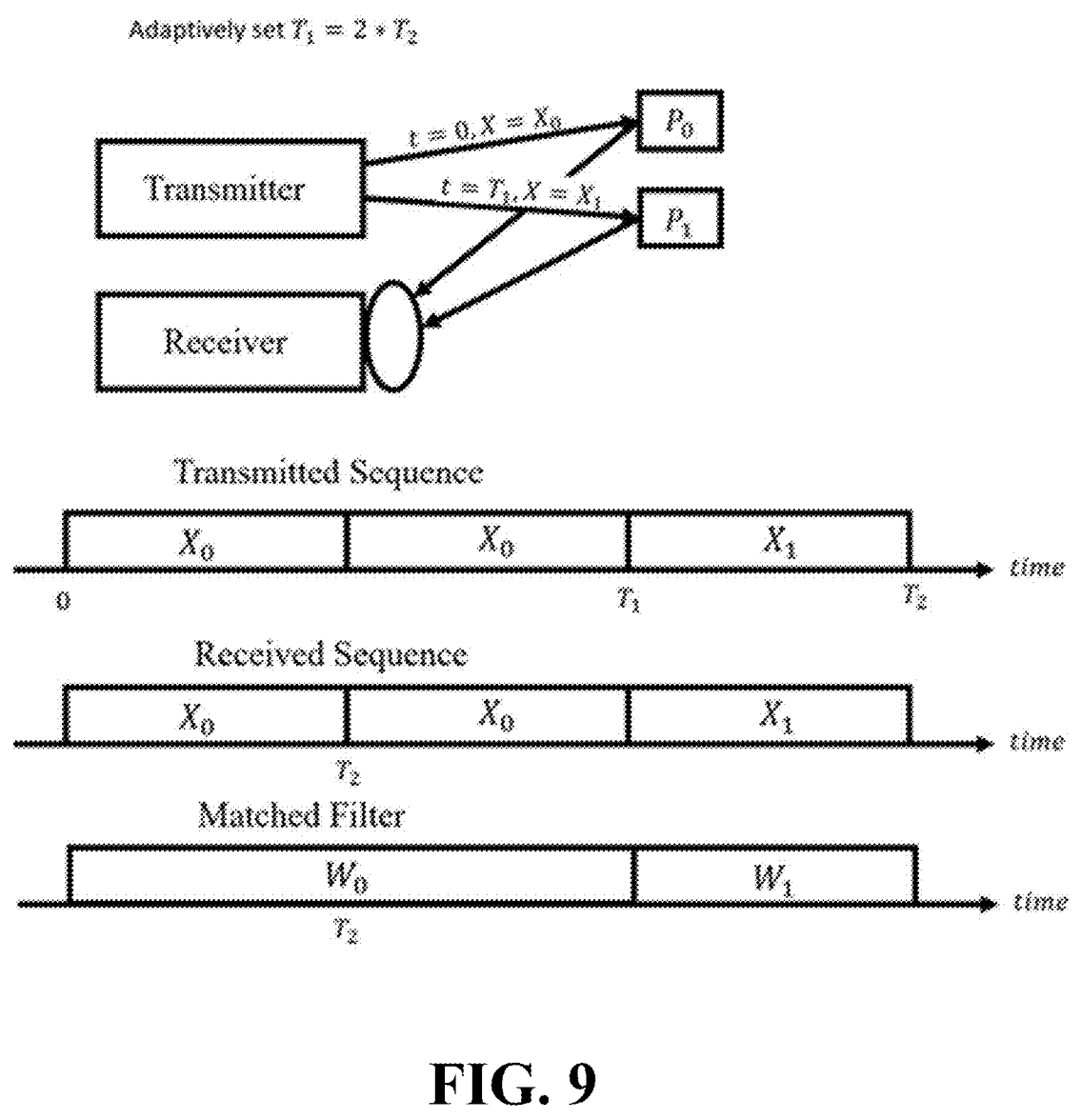

FIG. 9 is a block diagram illustrating an example, non-limiting embodiment of an adaptive acquisition time to improve ranging performance for point P 0 in accordance with various aspects described herein.

DETAILED DESCRIPTION

Figure 1:
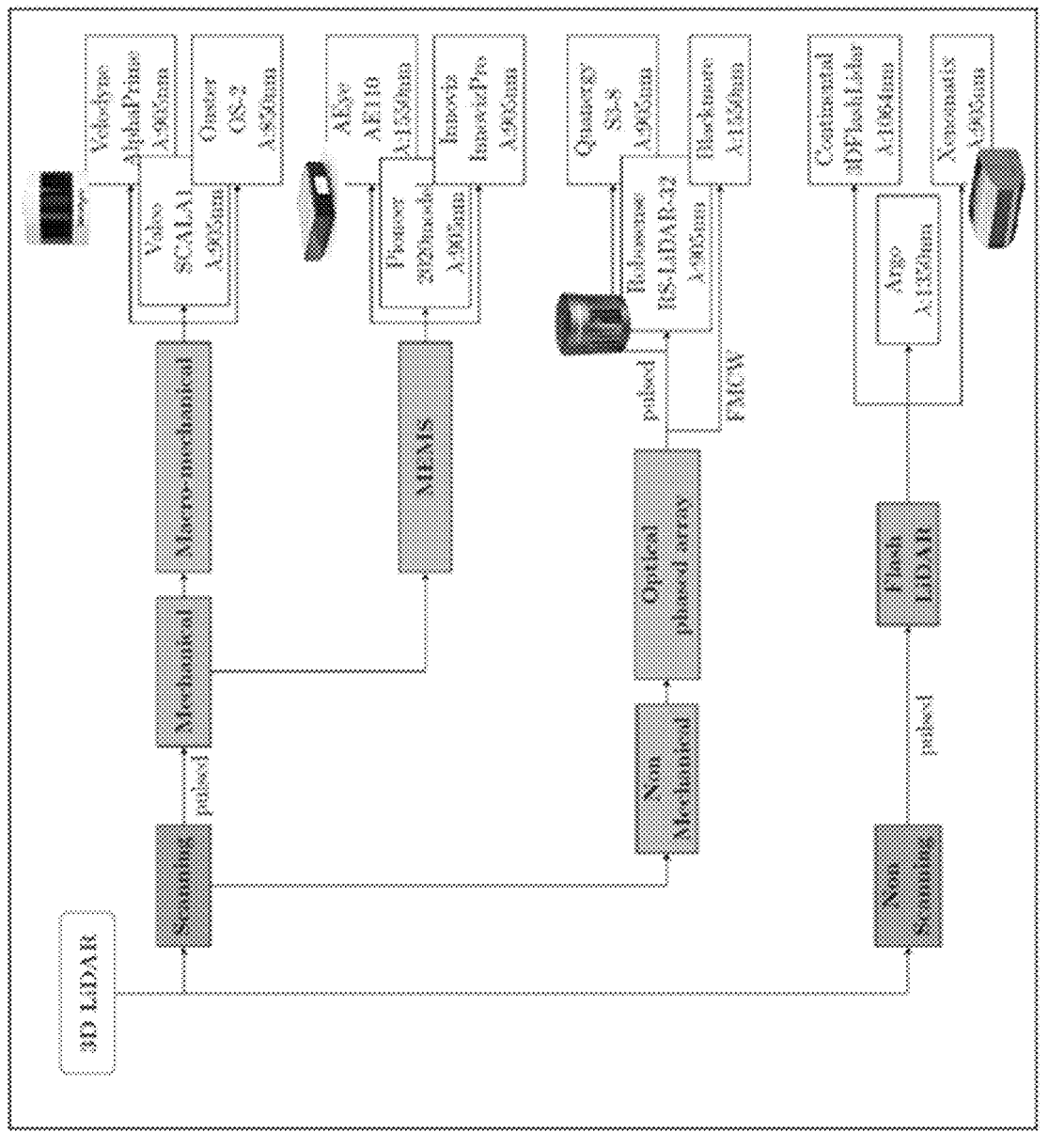
FIG. 1 is a block diagram illustrating an exemplary, non-limiting embodiment of various LiDAR techniques and architectures in accordance with various aspects described herein. See Hsu, C. P., Li, B., Solano-Rivas, B., Gohil, A. R., Chan, P. H., Moore, A. D. and Donzella, V., 2020. A review and perspective on optical phased array for automotive LiDAR. IEEE Journal of Selected Topics in Quantum Electronics, 27(1), pp. 1-16.

The subject disclosure describes, among other things, illustrative embodiments for an object detection and/or identification system. Other embodiments are described in the subject disclosure.

One or more aspects of the subject disclosure include a method for creating a first sequence of optical signals based on a first sequence of electrical signals supplied to a continuous-wave (CW) optical source, the first sequence of electrical signals associated with a plurality of matched filters; directing the first sequence of optical signals to a plurality of objects; receiving a second sequence of optical signals based on a reflection of the first sequence of optical signals on the plurality of objects; converting the second sequence optical signals into a second sequence of electrical signals; processing the second sequence of electrical signals according to the plurality of matched filters to extract information associated with the plurality of objects; adjusting the first sequence of electrical signals to a third sequence of electrical signals; adjusting the plurality of matched filters according to the third sequence of electrical signals; applying the third sequence of the electrical signals to the CW optical source to produce an adjusted sequence of optical signals; and directing the adjusted sequence of optical signals to further refine the extract information associated with the plurality of objects.

In one embodiment, the adjusting of the first sequence of electrical signals to the third sequence of electrical signals is based on the extracted information. In one embodiment, the adjusting the plurality of matched filters according to the third sequence of electrical signals is based on the extracted information. In one embodiment, the adjusted sequence of optical signals is directed to the plurality of objects subsequent to a completion of the first sequence of optical signals.

In one embodiment, a transmission of the adjusted sequence of optical signals based on the extracted information occurs within a period of receiving the second sequence of optical signals. In one embodiment, the period is less than 100 microseconds. In one embodiment, the period is less than 10 times a round-trip time of light reflected from the plurality of objects. In one embodiment, a length of the first sequence of electrical signals is greater than the period.

In one embodiment, an information rate of the first or second sequence of electrical signals has a bit rate that is greater than 20 gigabits per second. In one embodiment, a pattern length of the first sequence of electrical signals is greater than 1000 symbols. In one embodiment, a symbol interval of the first electrical signal is less than 50 picoseconds. In one embodiment, the processing to extract the information is substantially nonlinear. In one embodiment, the third sequence of electrical signals and the first second sequence of electrical signals are located in a single integrated circuit. In one embodiment, sequences of symbols in the first and third sequence of electrical signals are composed of periodic sequences of symbols. In one embodiment, sequences of symbols in the first and third sequence of electrical signals are composed of distinct sequences of symbols. In one embodiment, sequences of symbols in the first and third sequence of electrical signals are substantially orthogonal. In one embodiment, the first sequence of optical signals and the adjusted sequence of optical signals are generated from the CW optical source, and wherein the first and the third sequence of electrical signals are generated by electrical to optical modulation.

In one embodiment, a bandwidth of energy associated with the first, second and third sequence of electrical signals is greater than 10 GHz. In one embodiment, the first, second, and third sequences of electrical signals are composed of distinct subcarriers carrying dependent or independent sequences or subsequences which are then processed by a plurality of matched filters. In one embodiment, the first, second, and third sequences of electrical signals are composed of distinct wavelengths carrying dependent or independent sequences or subsequences which are then processed by a plurality of matched filters. In one embodiment, the first and second sequence of optical signals and the adjusted sequence of optical signals travel through air. In one embodiment, the converting the second sequence optical signals into the second sequence of electrical signals is performed by a detector with greater than 50 GHz bandwidth. In one embodiment, the converting of the second sequence of optical signals to the second sequence of electrical signals is performed with an intensity detector.

In one embodiment, the converting of the second sequence of optical signals to the second sequence of electrical signals is performed with a coherent detector. In one embodiment, the coherent detector uses a portion of the CW optical source as a local oscillator. In one embodiment, the coherent detector uses another CW optical source as a local oscillator.

In one embodiment, the processing of the second sequence of electrical signals comprises performing an analog-to-digital conversion. In one embodiment, the processing of the second sequence of electrical signals comprises performing digital signal processing. In one embodiment, at least a portion of the digital signal processing is performed in an application-specific integrated circuit (ASIC) or a field-programmable gate array (FPGA). In one embodiment, the processing comprises a correlation of the first and second sequence of electrical signals with a fixed-length matched filter. In one embodiment, the extracted information includes absorption (magnitude), delay (phase), orientation (polarization), or combinations thereof. In one embodiment, the extracted information is used to determine features of the plurality of objects, the features include range, velocity, signal-to-noise ratio (SNR), or combinations thereof. In one embodiment, sequences of symbols associated with the third sequence of electrical signals is generated based on at least a portion of the extracted information.

In one embodiment, the third sequence of electrical signals is composed of symbol sequences that have different electrical power relative to other sequences associated with the first sequence of electrical signals. In one embodiment, the third sequence of electrical signals is composed of symbol sequences that are orthogonal to other sequences of symbols associated with the first sequence of electrical signals. In one embodiment, a first symbol rate of the first sequence of electrical signals differs from a third symbol rate associated with the third sequence of electrical signals. In one embodiment, a total length in a first number of symbols of the first sequence of electrical signals differs from a third number of symbols associated with the third sequence of electrical signals. In one embodiment, a first length of first orthogonal sequences of the first sequence of electrical signals differs from a third length of third orthogonal sequences associated with the third sequence of electrical signals. In one embodiment, taps in the plurality of matched filters used for correlation are adapted to match the first sequence of electrical signals, the third sequence of electrical signals, or combinations thereof in an iterative fashion.

One or more aspects of the subject disclosure include a device that can comprise a processing system including a processor, and a memory that stores executable instructions that, when executed by the processing system, facilitate performance of operations. The operations can include creating a first sequence of optical signals based on a first sequence of electrical signals supplied to a continuous-wave (CW) optical source, the first sequence of electrical signals associated with a plurality of matched filters; directing the first sequence of optical signals to a plurality of objects; receiving a second sequence of optical signals based on a reflection of the first sequence of optical signals on the plurality of objects; converting the second sequence optical signals into a second sequence of electrical signals; processing the second sequence of electrical signals according to the plurality of matched filters to extract information associated with the plurality of objects; adjusting the first sequence of electrical signals to a third sequence of electrical signals; adjusting the plurality of matched filters according to the third sequence of electrical signals; applying the third sequence of the electrical signals to the CW optical source to produce an adjusted sequence of optical signals; and directing the adjusted sequence of optical signals to further refine the extract information associated with the plurality of objects.

One or more aspects of the subject disclosure include a machine-readable medium, that can comprise executable instructions that, when executed by a processing system including a processor, facilitate performance of operations. The operations can include creating a first sequence of optical signals based on a first sequence of electrical signals supplied to a continuous-wave (CW) optical source, the first sequence of electrical signals associated with a plurality of matched filters; directing the first sequence of optical signals to a plurality of objects; receiving a second sequence of optical signals based on a reflection of the first sequence of optical signals on the plurality of objects; converting the second sequence optical signals into a second sequence of electrical signals; processing the second sequence of electrical signals according to the plurality of matched filters to extract information associated with the plurality of objects; adjusting the first sequence of electrical signals to a third sequence of electrical signals; adjusting the plurality of matched filters according to the third sequence of electrical signals; applying the third sequence of the electrical signals to the CW optical source to produce an adjusted sequence of optical signals; and directing the adjusted sequence of optical signals to further refine the extract information associated with the plurality of objects.

Time-of-Flight (ToF) Direct Detection

Ranging information is derived by a scene by measuring the time-of-flight (ToF) of a laser pulse after it reflects from an object. A pulsed laser, which can emit pulses with a period of microseconds, is detected incoherently (intensity detection). Frequently, due to the worse receiver sensitivity of direct detection, multiple measurements must be made to determine accurate ranging. This can be done by histogramming the ToF using a time-to-digital converter (TDC), a photomultiplier tube (PMT), or time-correlated single-photon counter (TC-SPC).

One downside of pulsed laser transmission is that there is a limited ambiguity range. Simply, the transmit pulses need to be spaced far apart enough so that there is no ambiguity in which reflected pulse is received, otherwise there can be significant errors in ranging. With ToF methods based on direct detection, multiple measurements may be necessary to determine the velocity of the detected object.

Frequency-Modulated Continuous Wave (FMCW)

Figure 2:
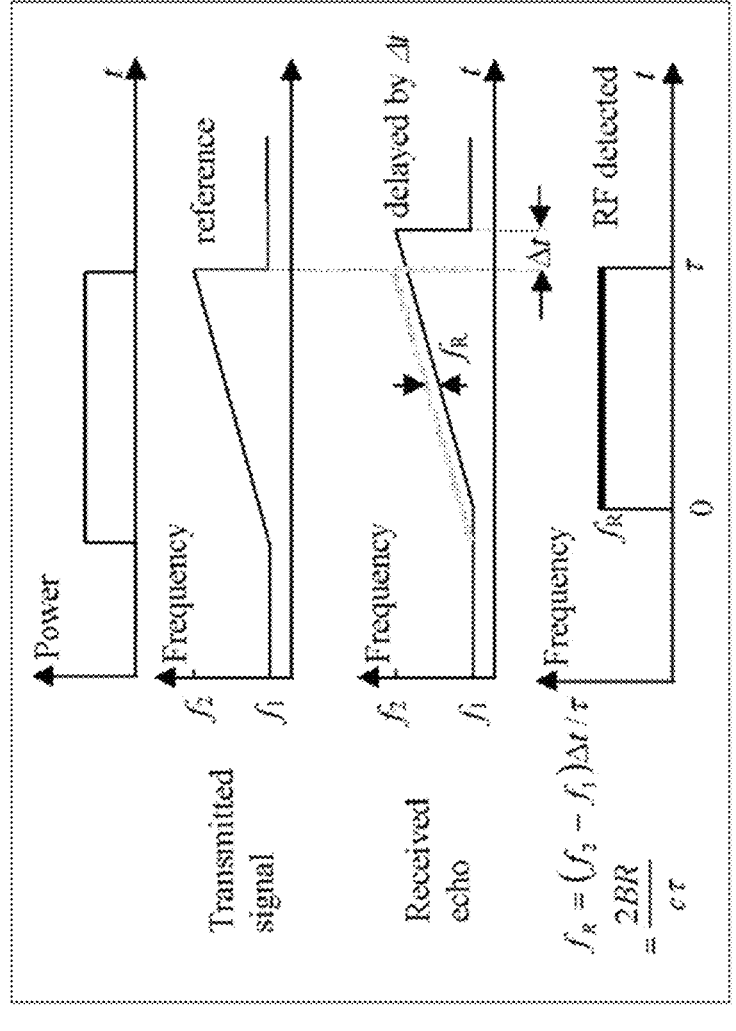
FIG. 2 is a block diagram illustrating an example, non-limiting embodiment of an FMCW technique for ranging in accordance with various aspects described herein. See Adany, P., Allen, C. and Hui, R., 2009. Chirped lidar using simplified homodyne detection. Journal of lightwave technology, 27(16), pp. 3351-3357.

The frequency-modulated continuous wave (FMCW) technique is a coherent technique where a laser is frequency-swept and then coherently combined with a local copy of itself after reflecting from the target as depicted in FIG. 2. Since the frequency of the optical source is time-dependent, the frequency difference between transmit and local fields in the coherent receiver translates directly to the range of the object, which is typically measured in the frequency domain via Fourier transform. In addition, the velocity of the ranged object can be detected by measuring the full frequency range of the received optical waveform. The magnitude and sign of the frequency shift (caused by the Doppler effect) can be used to determine the velocity of the object.

FMCW optical sources can be specifically designed lasers (such as ones used for optical coherence tomography) or they can be digitally chirped. Typical values for chirp rates are on the order of 10-100 MHz per microsecond. The coherent detection scheme for FMCW usually utilizes a single-quadrature homodyne coherent detector, though dual-quadrature coherent detectors can be used.

Pseudo-Randomly Modulated Continuous Wave (PRMCW) LiDAR

Figure 3:
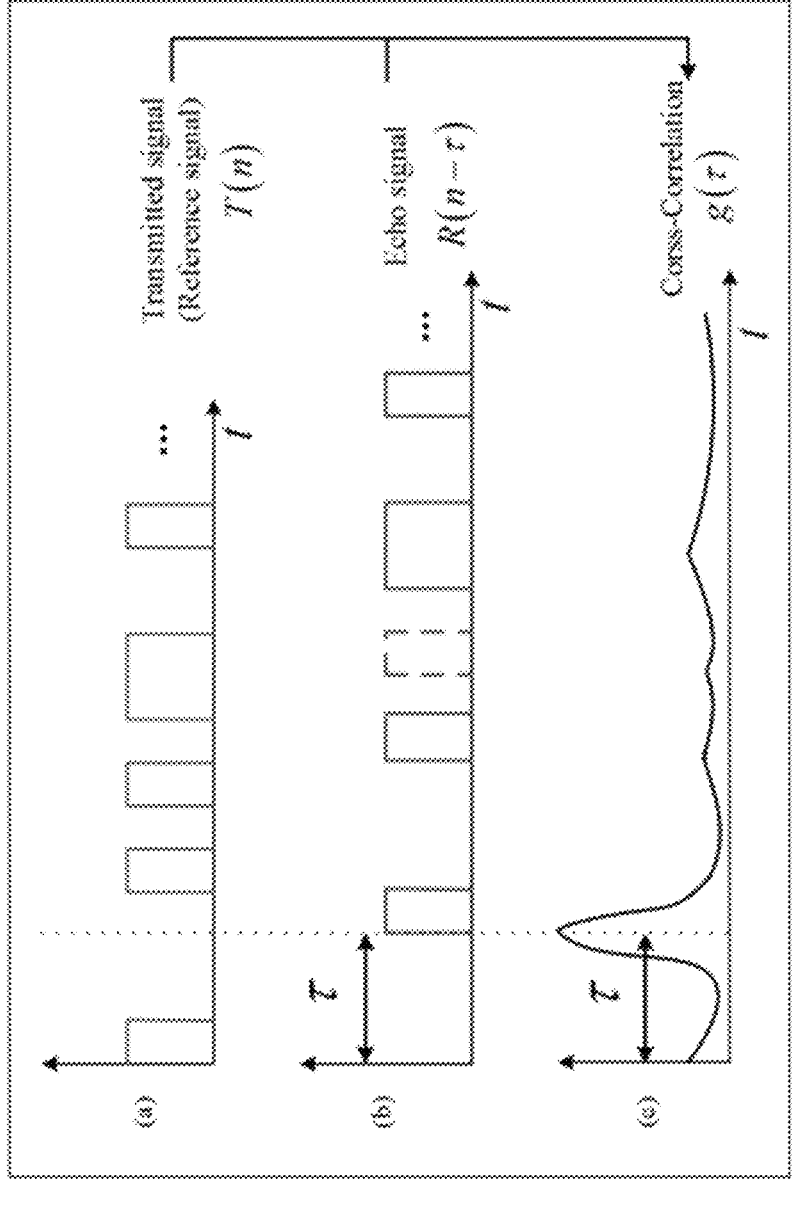
FIG. 3 is a block diagram illustrating an example, non-limiting embodiment demonstrating AMCW matched filtering for LiDAR ranging in accordance with various aspects described herein. See Yu, Y., Liu, B. and Chen, Z., 2019. Improving the performance of pseudo-random single-photon counting ranging lidar. Sensors, 19(16), p. 3620.
Figure 4:
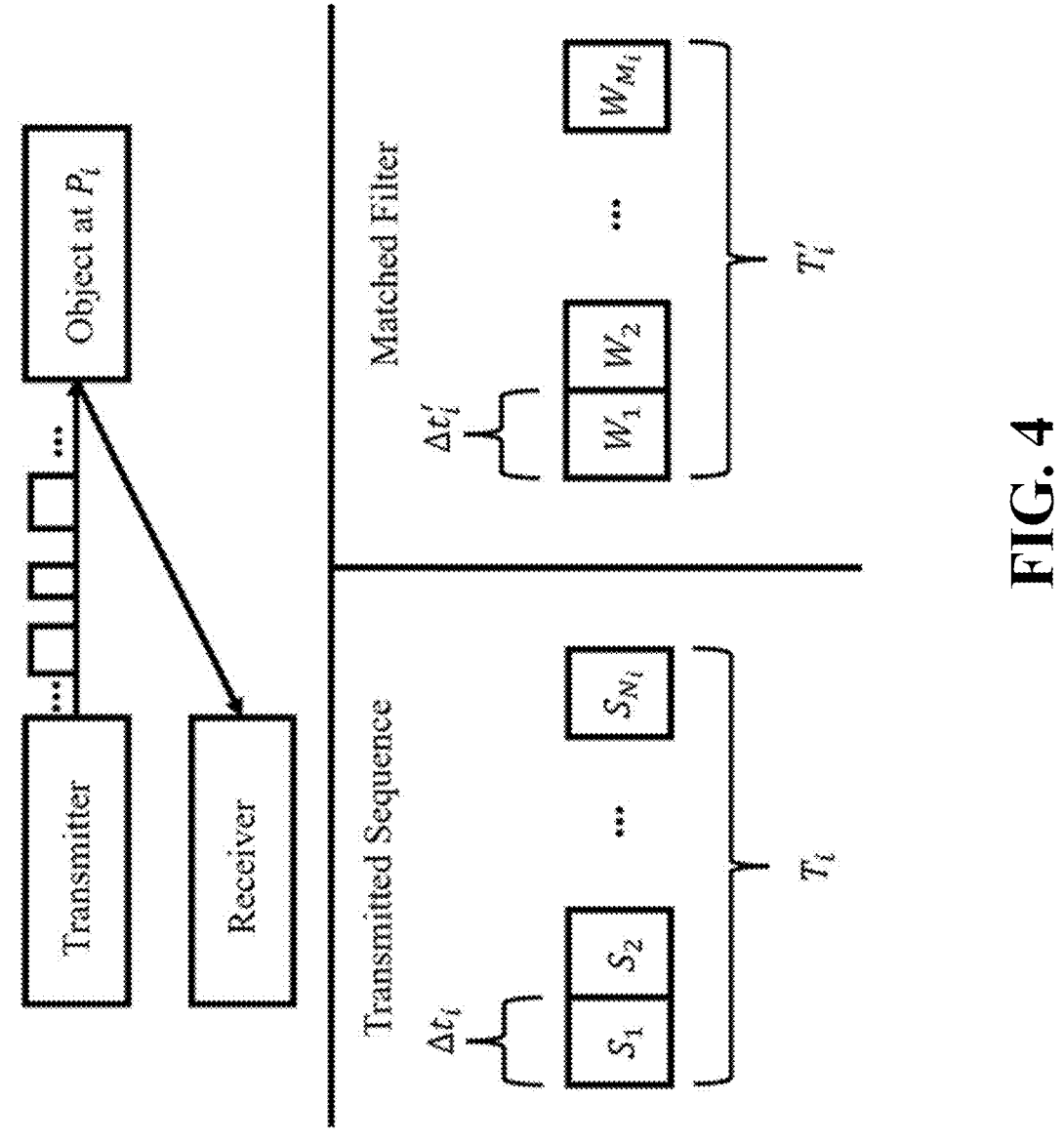
FIG. 4 is a block diagram illustrating an example, non-limiting embodiment demonstrating a canonical modulated LiDAR system in accordance with various aspects described herein.

PRMCW LiDAR relies on either direct or external modulation of an optical signal that is transmitted to a scene and then received in either a coherent or incoherent receiver. Frequently, the modulated signal is correlated with a local copy of itself (called matched filtering) in order to improve the SNR of the ranging measurement. FIG. 3 illustrates this technique for AMCW transmission and incoherent detection.

Sequence Length

The length of a sequence that is transmitted is important. This length is the number of symbols (a.k.a chips) in a pattern that is transmitted before the pattern is repeated. In a pulsed system this length is one symbol (plus the dead time between pulses). As described below, a desired sequence pattern can be chosen and transmitted repeatedly.

The length of the sequence in seconds, including any dead time, multiplied by the velocity of light in the medium, is equal to the round-trip ambiguity distance, assuming consecutive sequences are identical. A longer sequence can preclude the need for dead time. Longer sequences can provide better rejection of uncorrelated interference. The time duration of one symbol (chip time) strongly determines the distance resolution. Thus, the number of symbols in the sequence is important.

Amplitude Modulated Continuous Wave (AMCW)

AMCW is a modulated LiDAR technique, derived from RADAR techniques, where an optical signal is modulated with a known waveform and after reception correlated with itself. This technique can be used in a flash LiDAR configuration where a multi-pixel detector then is able to reconstruct the illuminated scene based on temporal correlations between different pixels. AMCW is typically used with incoherent detection techniques.

Random-Amplitude Modulated Continuous Wave (RAMCW)

RAMCW differs from AMCW in that the modulated waveform is selected from a class of orthogonal or pseudo-orthogonal random sequences. Some embodiments use raw pseudo-random binary sequence (PRBS) streams, maximal length sequences (MLS), Golay complementary pairs, Legendre sequences, or A* sequences. The chosen sequences are chosen to have excellent autocorrelation properties. In other words, their rejection of noise and other sequences is high. As in AMCW, incoherent detection is typically used to digitize or histogram the waveform, after which the sequence is correlated with a local copy to determine ranging. Importantly, relative object motion (which introduces a Doppler shift) or other temporal phase effect (such as laser linewidth) can degrade the matched filtering in the receiver and cause erroneous ranging. Incoherent detection of AMCW signals may not be able to estimate the velocity of the ranged object.

Coherent Random-Amplitude Modulated Continuous Wave (Coherent RAMCW)

Instead of using incoherent detection, it is also possible to use coherent detection to receive the transmitted waveforms. Typically, this is implemented with dual-quadrature coherent detection in order to estimate the relative phase of the received signal compared to the local oscillator. Dual-quadrature coherent receivers can be either heterodyne or homodyne. In this case, after digitization, temporal phase effects can then be corrected before matched filtering to ensure accurate ranging and velocity estimation.

Local Processing

In some embodiments of LIDAR applications, the latency due to offline processing is acceptable. The geographic separation between the receiver and the processor places a lower bound on this latency. The amount of data received in one scan and the transmission capacity to the processor create another source of latency. (In a digital system this is bits per scan and bits per second; the ratio of which is seconds per scan.) For example, if the distance from the receiver to the processor and then to the transmitter is 100 km and optical fibers are used for the connection, the latency due to the speed of light in glass is approximately 500 microseconds.

When the receiver is mobile or hidden, the transmission capacity may be very limited, producing large latencies in sending the data. Degradation of that transmission can cause a dramatically large latency. There may be applications where this latency is not acceptable. One attempt to alleviate this issue is by locally compressing the information in the point cloud to reduce the transmission bottleneck.

Real-Time Processing

When the medium is not static, adaptive probing may not tolerate the latency due to offline processing. Real-time decision making at the site of the receiver may not tolerate that latency. For example, braking or steering an autonomous vehicle.

For real-time LiDAR systems, for example those intended for vehicles, where the captured data cannot be processed offline, there are some limitations to the typical matched filtering technique. In the subject disclosure, an offline matched filtering LiDAR system may be defined as a system that cannot store and export captured waveforms for processing with variable-length, typically long, matched filters. Due to the amount of data captured in real-time LiDAR systems, this is a typical constraint for commercial products.

For LiDAR waveforms to be processed with the matched filtering technique in real-time, there are some compromises that are usually made. First, the matched filter needs to be of a fixed, relatively small, length in order to reduce the complexity and power consumption of the matched filtering. One issue with this is that it caps the SNR of the range measurement for any point in the point cloud. Since a given 2D or 3D point cloud may be composed of a diverse range of objects at different ranges, ranges, reflectivity, and path losses, it may be more efficient to tailor the waveform on a per-point basis.

Second, the matched filter is typically static or pseudo-static. Since the filter is fixed, this means that the transmitted waveform needs to be fixed as well for the matched filter to effectively measure the range of an object. A fixed waveform has the following downsides: (1) For wide-aperture receivers, it is possible to receive ambiguous data. In other words, if you send the same orthogonal sequence to each point in the point cloud, and you can receive pulses from different locations in the point cloud, you might detect objects at two ranges at the same time and be unable to distinguish between them; (2) If the transmitted sequence is the same pulse each time, a malicious actor may be able to learn the sequence and send it back to the receiver at the correct time to trick the receiver into falsely identifying an object or conversely, not identifying an object.

Canonical LiDAR Modulation Scheme

To illustrate features of the subject disclosure, we can examine a LiDAR system with the following features:

A transmitted sequence is reflected off an object located within the volume addressed by the point in the point cloud denoted $P_i$, of which there are $N_{pts}$ The sequence that addressed $P_i$ is composed of $N_i$ symbols denoted $S_i$. All $N_i$ symbols may compose an orthogonal sequence of length $N_i$, or the symbols may be split into multiple sequences of length $<N_i$, The total sequence period $T_i$ is determined by the total number of symbols $N_i$ and the symbol period $\Delta t_i$ At the receiver, a filter is used to extract ranging information from the transmitted sequence. The filter is composed of $M_i$ taps labeled $W_i$ The total filter length in time is $T_i$ and taps are spaced at $\Delta t_i'$.

The embodiments discussed below center around using a transmitted sequence and receiver filter that can be adaptively updated and changed to improve one or more aspects of the ranging/velocity measurement. The proposed method is to use a transmitter/receiver system that can communicate with an external processor (e.g., an FPGA) with very short latency. If the processing time on the processor is sufficiently short, then point-wise, or frame-wise decisions, can be made. Here point-wise refers to adaptive changes that address individual points in the point cloud separately. Frame-wise would mean that the adaptive changes would happen after processing each point at least once in the point cloud. There is also the possibility of adaptive changes after addressing a subset of the points. One example of this would be to make adaptive changes in a 2D raster-scanned system where you address points in one line of the scene and then shift to the line above. If a decision can be made quickly to flag a certain area of interest or of no interest, the system can address points clustered near that area on the next line scan (slower than point-wise, but quicker than frame-wise).

In addition, the embodiments below may be used with prior information about the scene or without prior information. On example of prior information about the scene would be a calibration scan to determine features about the scene. Then adaptive changes can be made to track smaller changes more accurately. Alternatively, decisions could be made on the first scan of a scene based on immediate feedback. Based on the foregoing embodiments, the processor can be adapted to use object classification methods to determine regions of interest. The object classification can output a subset of points based on a full set or a subset of the point cloud data.

Adaptive Transmitter and Receiver System

Figure 5:
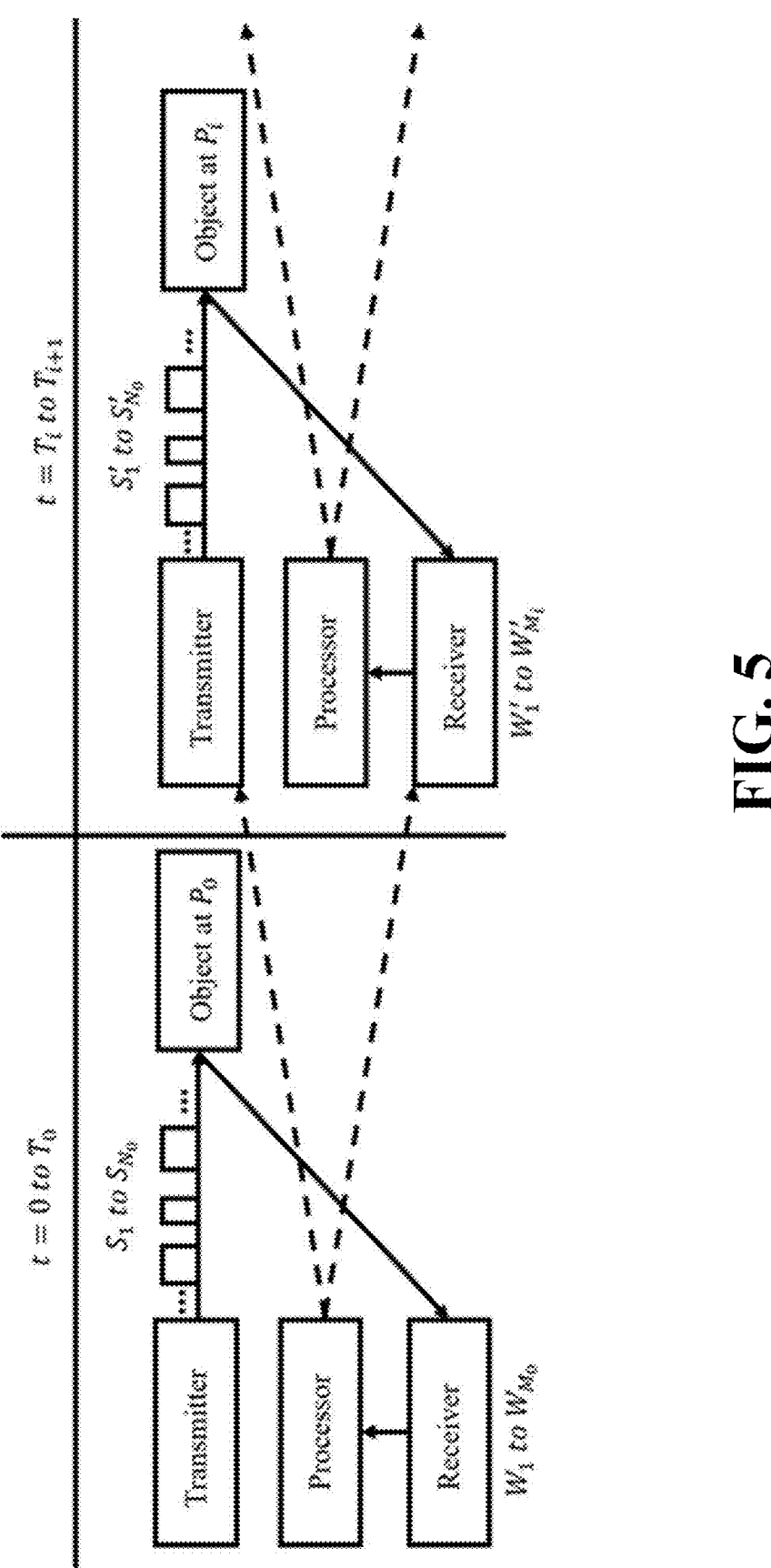
FIG. 5 is a block diagram illustrating an example, non-limiting embodiment demonstrating an adaptive transmitter and receiver system where information from the receiver is passed to a processor which then updates the transmit and receive blocks in accordance with various aspects described herein.

A diagram is shown in FIG. 5 that demonstrates a canonical adaptive transmitter and receiver system.

Adaptively Updating Fixed-Length Symbol Sequences

Power Re-Allocation

Figure 6:
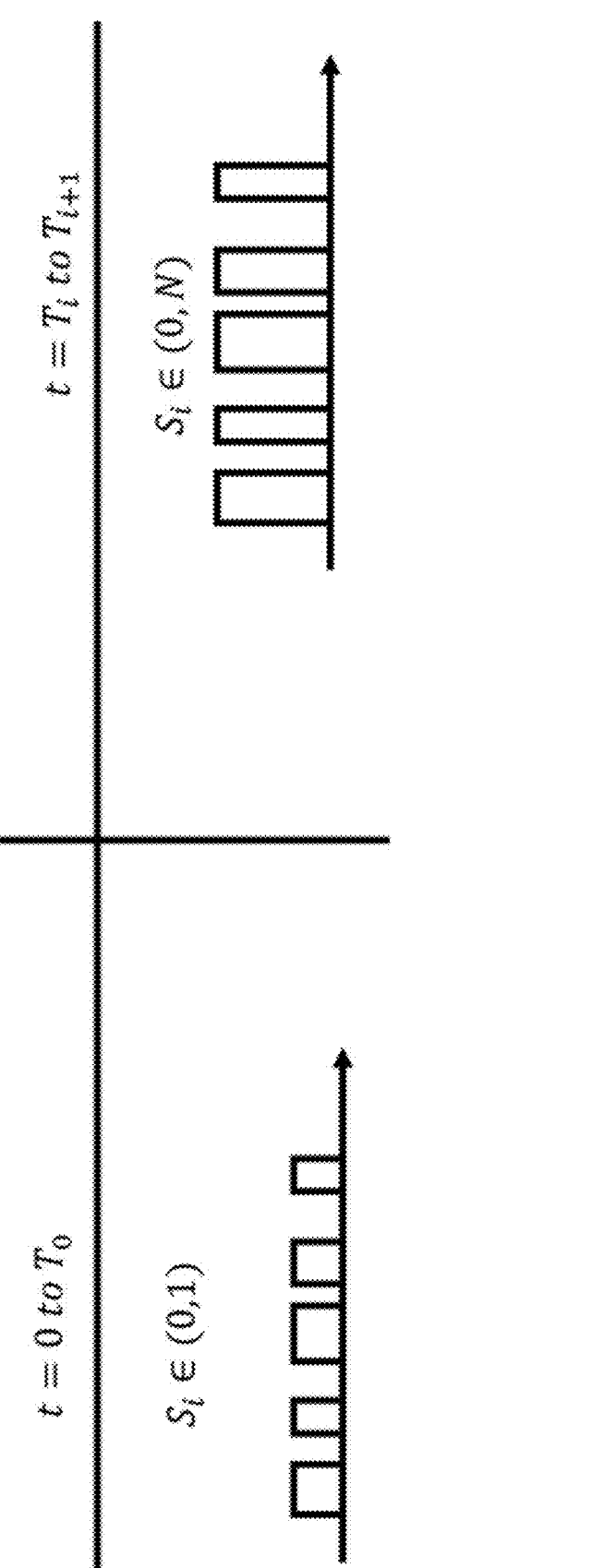
FIG. 6 is a block diagram illustrating an example, non-limiting embodiment demonstrating fixed symbol-length power re-allocation for a sequence in accordance with various aspects described herein.

With feedback or information about the imaged scene, the transmitter algorithm can decide to send a different symbol sequence in a given acquisition time $T_i$. One embodiment is to change the power of a fixed-length symbol sequence based on electronic feedback to increase or decrease optical power that addresses a specific point or subset of points. For example, if the processor indicates one subset of points has been poorly imaged or has a poor SNR, the symbol sequence power can be increased to compensate for the low SNR as depicted in FIG. 6. This may be implemented in an external electro-optic modulator by delivering a higher power RF signal to reduce modulator loss. In a directly modulated system, this could be implemented by driving the laser with higher current. Potential benefits of this method include improved transmitter/receiver efficiency.

Symbol Sequence and Matched Filter Adaptations

Figure 7:
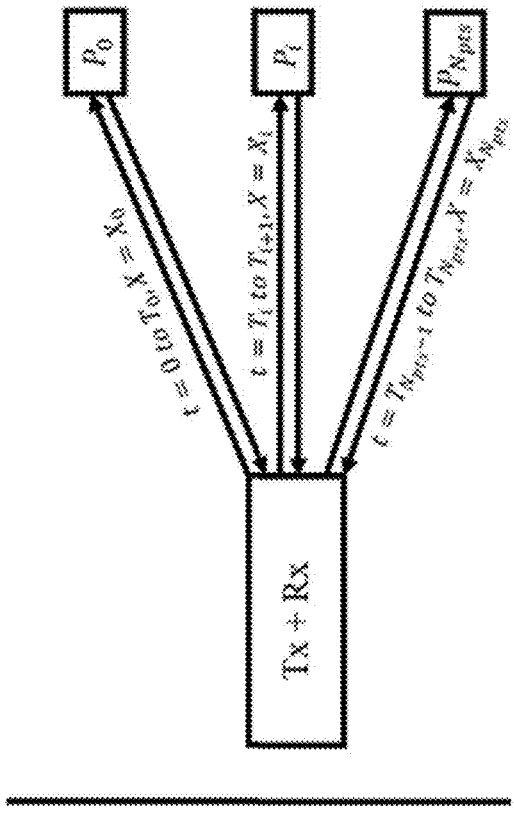
FIG. 7 is a block diagram illustrating an example, non-limiting embodiment demonstrating adaptive symbol sequence changes ensuring an observer at $P_0$ cannot learn the symbol sequence and trick the measurement at $P_i$ in accordance with various aspects described herein.

Alternatively, or in combination with one or more of the foregoing embodiments, different points, or point clusters, can be addressed with different symbol sequences. Here, after a certain time period, the transmitted symbol sequence is changed to a separate orthogonal sequence. After an additional time-period, which may correspond to a point acquisition time $T_i$, the matched filter can then be updated in order to discriminate symbol sequences corresponding to the newly updated symbol sequence. What distinguishes these embodiments from other systems are that decisions about the limited-length matched filter are done adaptively in real-time with a single matched filter. There are at least two possible benefits:

First, this technique enables a secure form of LiDAR that is resistant to interference from ambient light (potentially solar), light from similar LiDAR systems, or targeted light from malicious actors. In the latter, it is possible to trick the receiver into predicting objects that don't exist, or alternatively, into obscuring objects. In a typical real-time modulated receiver implementation, a fixed transmitter sequence and matched filter would be used, which could be predicted. By changing the symbol sequence quickly and randomly, the receiver is sure that the received pulse originated locally. This is shown in FIG. 7.

Figure 8:
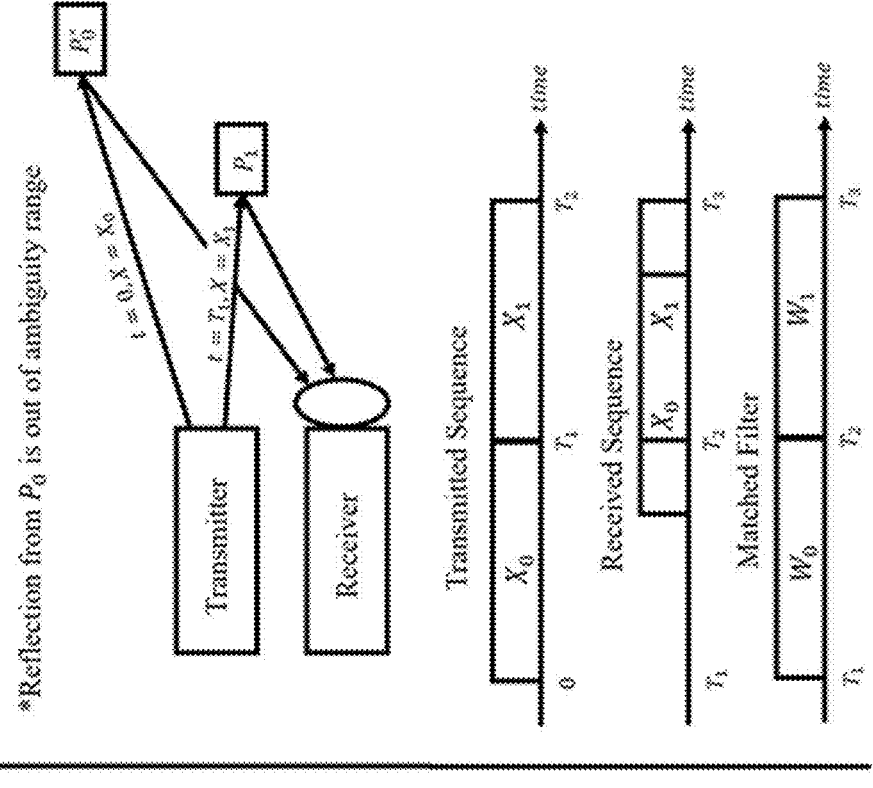
FIG. 8 is a block diagram illustrating an example, non-limiting embodiment demonstrating a technique for updating transmitted sequences and matched filter taps to reject reflected light out of an ambiguity range in accordance with various aspects described herein.
Figure 8:
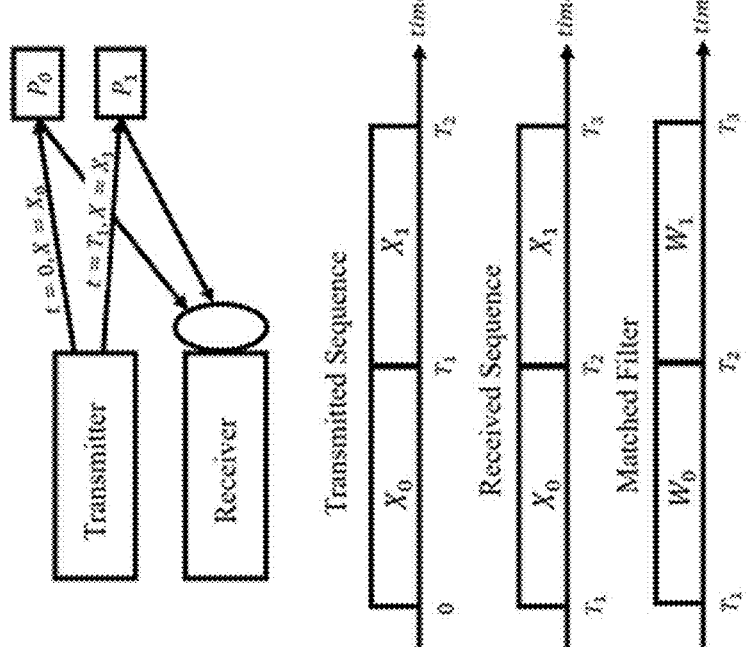

Second, this method can improve the spatial discrimination of a LiDAR system that can capture reflected light from multiple points in the point cloud at the receiver. This may be intentionally done using a wide-aperture receiver, or could be unintentional from other aspects of the receiver design. In a typical system, reflections from elsewhere in the scene, or in the ambiguity zone of another point, could cause a reduction in performance at the receiver. By assigning an orthogonal sequence to a known time interval, which is correlated with ranging of a specific point in the point cloud, other reflections can be avoided. This requires the matched filter to synchronously update its taps to reject other reflections. This embodiment is shown in the rightmost subfigure in FIG. 8, where the sequence $X_0$, which reflects off $P_0$ outside of the ambiguity range, is rejected because the matched filter has been updated to reject the neighboring point's sequence.

Adaptively Updating Sequence Temporal Properties

Symbol Rate Adaptation

In some scenes, different points may require different ranging resolutions. By identifying points in the point cloud that require higher ranging resolution, an adaptive transmitter can change the symbol rate of the sequence, which necessarily requires cooperatively changing the taps in the matched filter. In this case, there is a tradeoff with SNR, which may be partially or fully mitigated by increased averaging in a time period of equal length.

Acquisition Time Adaptation

By adapting the total acquisition time per point, it is possible to redistribute the point cloud to emphasize more important features. There are at least two possible advantages associated with this technique:

First, given the quick feedback from the processing unit, an optical scanning system can be triggered to an output signal from the processor to remap the per-point acquisition times $T_i$, to emphasize more important features in the point cloud. In concert, the transmitter and matched filter can then be updated to reflect the new acquisition time. For example, if orthogonal sequences are assigned to different points, then the transmitted sequence would need to be composed of replicated sequences that match the new acquisition time. When the acquisition time ends, the transmitter would then need to change to replicating the next point's unique sequence. This is similar to, but an extension of, the idea in FIG. 8, where points (corresponding to fixed time intervals) are separated by separately coded sequences. Here, in addition, the acquisition time of a specific point is adaptively changed for a specific point. FIG. 9 shows the example of increasing the acquisition time of $P_0$ to improve performance for that point.

Second, for scanning systems that require waiting for a transmitted pulse to be received before moving to another point, for example with a narrow-aperture system, then the total time of flight restricts the total received sequence length that can be captured before moving on to the next point. Alternatively, with a prior estimate of the range of a point, either predicted or measured in a previous scan, it is possible to send additional sequences in that acquisition period to increase the SNR or ranging resolution on a per-point basis.

Orthogonal Sequence Length Adaptation

One can also change the orthogonal sequence length. This can be done to increase or decrease the ambiguity range. Alternatively, the orthogonal sequence length can be adjusted to target a specific point-wise SNR. By reducing the orthogonal sequence length, along with an adaptive decrease in the acquisition time (as described above), more points can be measured in a fixed measurement time.

Insertion of a Time Stamp

A time-stamp can be added before, after or within orthogonal pulses in order to distinguish them.

Figure 10:
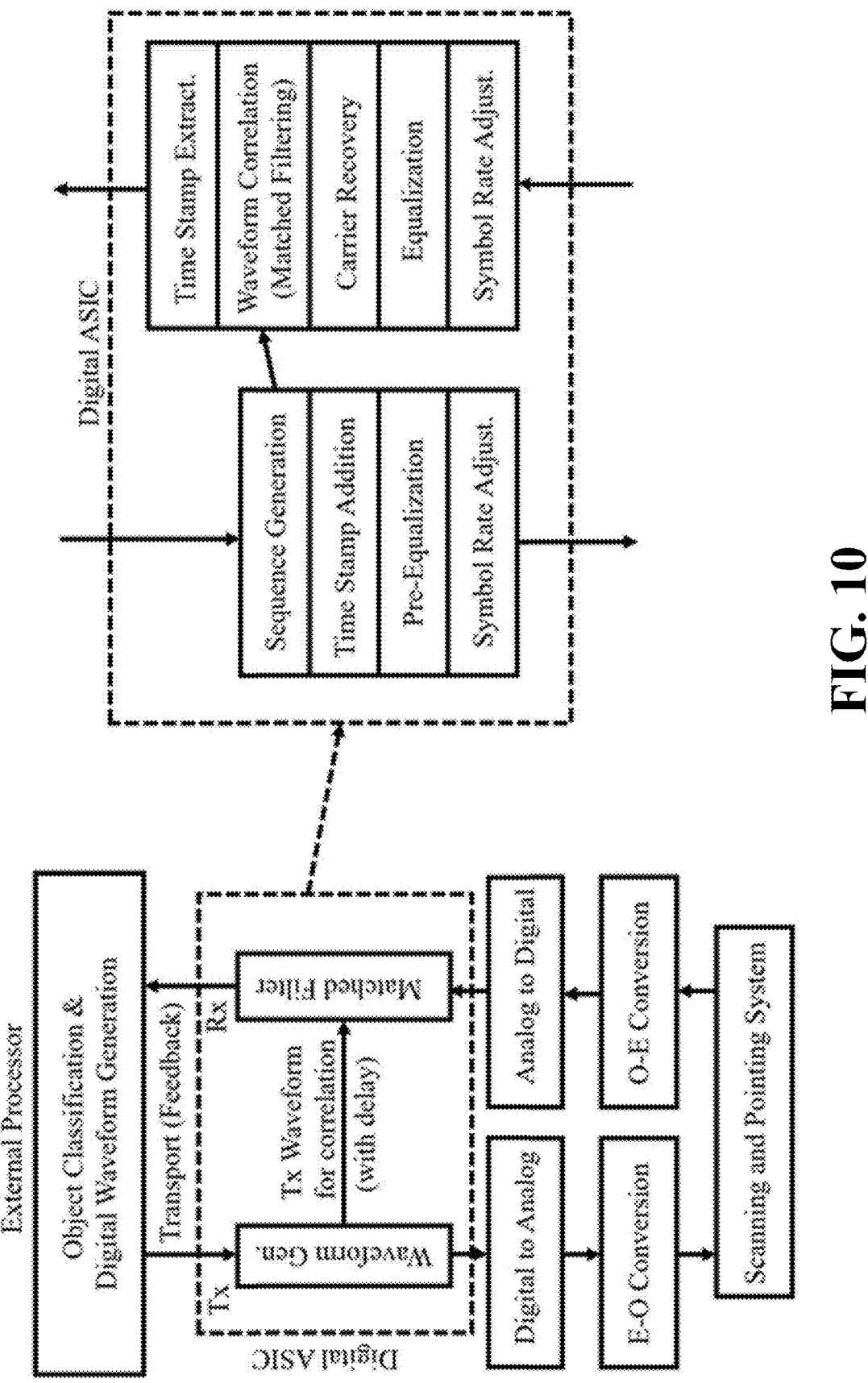
FIG. 10 is a block diagram illustrating an example, non-limiting embodiment of a LiDAR system using a digital ASIC, fast feedback, and matched filtering. Note that many other steps and substeps can be included or removed from the flow shown above in accordance with various aspects described herein.

FIG. 10 depicts a hardware illustration of the foregoing embodiments. Note that many other steps and substeps shown in FIG. 10 can be included or removed from the flow shown above in accordance with various aspects described herein.

Correlation via a matched filter has been described in the foregoing embodiments. This linear filtering can be implemented in the time and or frequency domains. Nonlinear processing can be used [e.g. methods described in Van Trees]. Noise-enhanced methods can be used, as an example of nonlinear thresholding. Median filtering can be useful. Averaging is often useful. These methods can be combined.

For simplicity of implementation, a repetitive pattern is can be used. Much longer patterns can be used, indeed the pattern length can be much longer than the processing interval such as, for example, a $2^{49}$-1 pseudo-random sequence. To mitigate malicious detection or jamming, a cryptographic sequence could be used. AES-256 Counter Mode has a pattern length of $2^{128}$ 128-bit words. With these long patterns, the receiver can be configured to correlate to the subset of the pattern that has been transmitted in the relevant time interval.

Patterns can be varied in a pre-determined manner, or as described above, adaptively. There can be patterns of patterns.

The processing can occur in a plurality of processing units or processing algorithms. For example, preprocessing in one unit may reduce the volume of the data that is sent to a second unit for further processing.

For simplicity of explanation, time-domain adaptation has been described. The spectral content of the stimulus can have real-time adaptation. The statistical properties of the stimulus such as peak-to-RMS, probabilistic shaping, or statistical moments can be adapted in real-time.

It is generally desirable to adapt the stimulus and to adapt the corresponding receive processing to match. However, the adaptation can be fully or partially stimulus, preprocessing, or processing.

Adaptations of the foregoing embodiment(s) can be a modulation or variation of a base pattern. For example, the base pattern could be AES-256 Counter Mode and the adaptations are applied in the frequency domain to change the amplitude spectrum. In another adaptation example, the base pattern can be time-dilated by changing the symbol interval. The interval could be smoothly ramped or could have discontinuous changes. Adaptations can be added to a base pattern. Adaptations could be the removal of aspects of a base pattern.

A continuous-wave (CW) optical source often comprises modulations or dithers which are smaller in amplitude or phase or frequency than the subsequent modulation by the stimulus pattern. A CW optical source can also comprise intensity noise, phase noise, power supply noise, and other modulated or additive components. A CW optical source is distinguished from a pulse source in that substantial energy is present for a time interval that covers a plurality of symbols.

Systems can operate at a plurality of wavelengths, in time sequence and/or in parallel. A plurality of transmitters and or receivers can operate with spatial or mode diversity. Aspects of the processing of diverse signals can occur in a common unit or algorithm, or in diverse units. Adaptation can occur across the diverse signals.

An adaptation could change a wavelength or a spatial or mode property of the third optical signal.

The wavelength of the CW optical source can be advantageously of the order of one micrometer. However, any wavelength less than one millimeter may be used when suitable for the application.

Figure 11:
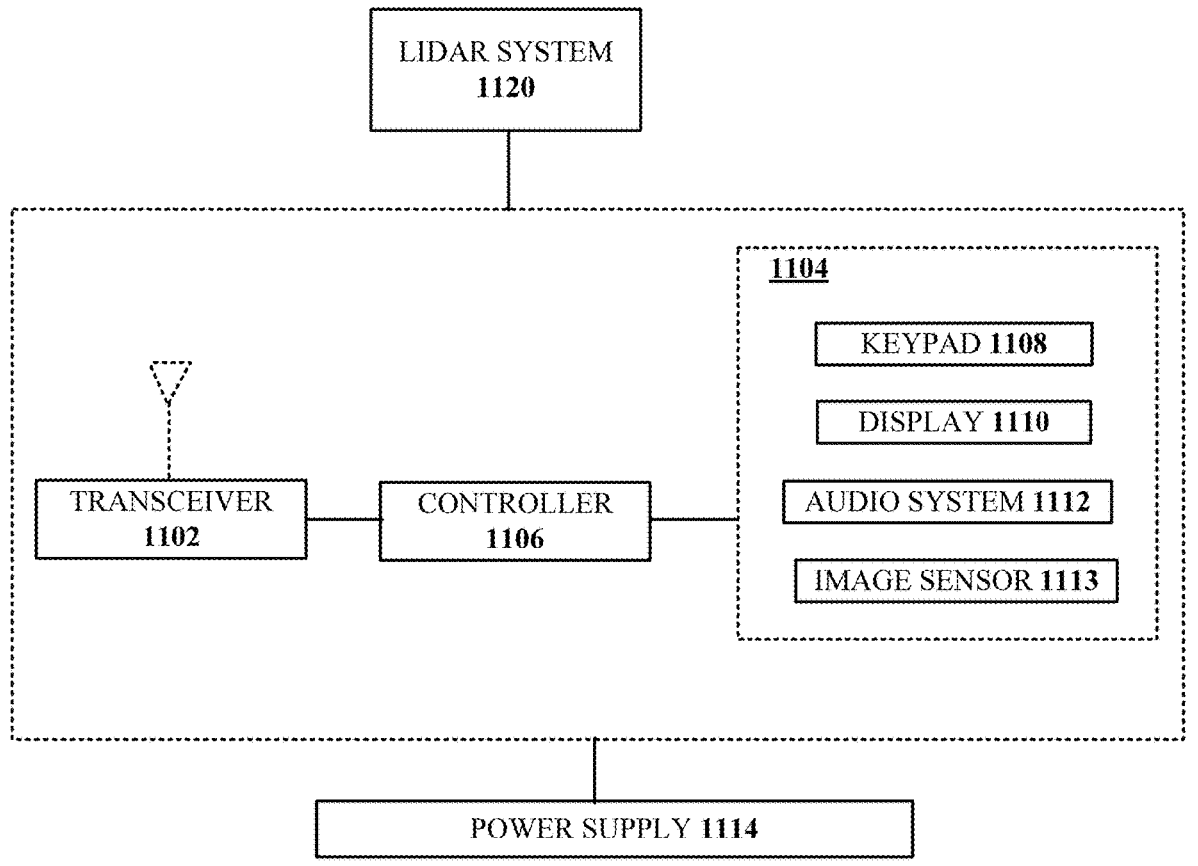
FIG. 11 is a block diagram of an example, non-limiting embodiment of a communication device in accordance with various aspects described herein.

Turning now to FIG. 11, an illustrative embodiment of a communication device 1100 is shown. The communication device 1100 can be used in a stationary or movable device. For example, the communication device 1100 can be used in an automobile such as a driverless vehicle, a flying object such as an unmanned aerial vehicle (UAV), or other device that can make use of the LIDAR system 1120 such as depicted in FIG. 10. It will be appreciated that the communication device 1100 can have more or less of the features described in FIG. 10. For example, the communication device 1100 may not require a user interface 1104.

The communication device 1100 can comprise a wireline and/or wireless transceiver 1102 (herein transceiver 1102), a user interface (UI) 1104, a power supply 1114, and a controller 1106 for managing operations thereof. The transceiver 1102 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 1102 can also be adapted to support circuit-switched wireline access technologies (such as PSTN), packet-switched wireline access technologies (such as TCP/IP, VoIP, etc.), and combinations thereof.

The UI 1104 can include a depressible or touch-sensitive keypad 1108 with a navigation mechanism such as a roller ball, a joystick, a mouse, or a navigation disk for manipulating operations of the communication device 1100. The keypad 1108 can be an integral part of a housing assembly of the communication device 1100 or an independent device operably coupled thereto by a tethered wireline interface (such as a USB cable) or a wireless interface supporting for example Bluetooth®. The keypad 1108 can represent a numeric keypad commonly used by phones, and/or a QWERTY keypad with alphanumeric keys. The UI 1104 can further include a display 1110 such as monochrome or color LCD (Liquid Crystal Display), OLED (Organic Light Emitting Diode) or other suitable display technology for conveying images to an end user of the communication device 1100. In an embodiment where the display 1110 is touch-sensitive, a portion or all of the keypad 1108 can be presented by way of the display 1110 with navigation features.

The display 1110 can use touch screen technology to also serve as a user interface for detecting user input. As a touch screen display, the communication device 1100 can be adapted to present a user interface having graphical user interface (GUI) elements that can be selected by a user with a touch of a finger. The display 1110 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1110 can be an integral part of the housing assembly of the communication device 1100 or an independent device communicatively coupled thereto by a tethered wireline interface (such as a cable) or a wireless interface.

The UI 1104 can also include an audio system 1112 that utilizes audio technology for conveying low volume audio (such as audio heard in proximity of a human ear) and high-volume audio (such as speakerphone for hands free operation). The audio system 1112 can further include a microphone for receiving audible signals of an end user. The audio system 1112 can also be used for voice recognition applications. The UI 1104 can further include an image sensor 1113 such as a charged coupled device (CCD) camera for capturing still or moving images.

The power supply 1114 can utilize common power management technologies such as replaceable and rechargeable batteries, supply regulation technologies, and/or charging system technologies for supplying energy to the components of the communication device 1100 to facilitate long-range or short-range portable communications. Alternatively, or in combination, the charging system can utilize external power sources such as DC power supplied over a physical interface such as a USB port or other suitable tethering technologies.

The controller 1106 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1100.

All subject matter in the attached appendices is incorporated herein by reference and any embodiments in the appendices can be combined in whole or in part with the subject disclosure.

The terms "first," "second," "third," and so forth, as used herein, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices. Some of the embodiments described herein can also employ artificial intelligence (AI) to facilitate automating one or more features described herein. Classification as used herein also is inclusive of statistical regression that is utilized to develop models of priority.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and any appended claims should generally be construed to mean "one or more" unless specified otherwise or clear from context to be directed to a singular form.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed herein are intended to embrace all such alterations, modifications and variations that fall within the spirit and scope of any appended claims. Furthermore, to the extent that the term "includes" is used in either the detailed description or any claims, such term is intended to be inclusive in a manner similar to the term "comprising" as "comprising" is interpreted when employed as a transitional word in a claim.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A non-transitory, machine-readable medium, comprising executable instructions that facilitate performance of operations by circuitry, the operations including:

creating a first sequence of optical signals based on a first sequence of electrical signals supplied to a continuous-wave (CW) optical source, the first sequence of electrical signals associated with a plurality of matched filters, wherein a first portion of optical signals in the first sequence of optical signals is directed to a first feature of a plurality of objects, wherein a second portion of optical signals in the first sequence of optical signals is directed to a second feature of the plurality of objects, and wherein characteristics of the first portion of optical signals are adjusted differently from characteristics of the second portion of optical signals;

directing the first sequence of optical signals to the plurality of objects;

receiving a second sequence of optical signals based on a reflection of the first sequence of optical signals on the plurality of objects;

converting the second sequence of optical signals into a second sequence of electrical signals;

processing the second sequence of electrical signals according to the plurality of matched filters to extract information associated with the plurality of objects to identify the first feature and the second feature of the plurality of objects;

adjusting the first sequence of electrical signals to a third sequence of electrical signals;

adjusting the plurality of matched filters according to the third sequence of electrical signals;

applying the third sequence of electrical signals to the CW optical source to produce an adjusted sequence of optical signals, the adjusted sequence of optical signals including a first adjustment to the characteristics of the first portion of optical signals and a second adjustment to the characteristics of the second portion of optical signals with the first adjustment differing from the second adjustment; and directing the adjusted sequence of optical signals to further refine the identification of the first feature and the second feature of the plurality of objects.

2. The non-transitory, machine-readable medium of claim 1, wherein the adjusting of the first sequence of electrical signals to the third sequence of electrical signals is based on the extracted information, wherein the adjusting the plurality of matched filters according to the third sequence of electrical signals is based on the extracted information, and wherein the adjusted sequence of optical signals is directed to the plurality of objects subsequent to a completion of the first sequence of optical signals.

3. The non-transitory, machine-readable medium of claim 1, wherein the directing of the adjusted sequence of optical signals occurs within a period of receiving the second sequence of optical signals.

4. The non-transitory, machine-readable medium of claim 3, wherein the period is less than 100 microseconds or less than 10 times a round-trip time of light reflected from the plurality of objects, and wherein a length of the first sequence of electrical signals is greater than the period.

5. The non-transitory, machine-readable medium of claim 1, wherein an information rate of the first sequence of electrical signals or the second sequence of electrical signals has a bit rate that is greater than 20 gigabits per second.

6. The non-transitory, machine-readable medium of claim 1, wherein a pattern length of the first sequence of electrical signals is greater than 1000 symbols, wherein a symbol interval of the first sequence of electrical signals is less than 50 picoseconds, wherein the processing to extract the information is substantially linear or nonlinear, and wherein the third sequence of electrical signals and the first sequence of electrical signals or the second sequence of electrical signals are located in a single integrated circuit.

7. The non-transitory, machine-readable medium of claim 1, wherein sequences of symbols in the first sequence of electrical signals or the second sequence of electrical signals are composed of periodic sequences of symbols.

8. The non-transitory, machine-readable medium of claim 1, wherein sequences of symbols in the first sequence of electrical signals and the third sequence of electrical signals are composed of distinct sequences of symbols, wherein the sequences of symbols in the first sequence of electrical signals and the third sequence of electrical signals are substantially orthogonal, and wherein the first sequence of optical signals and the adjusted sequence of optical signals are generated from the CW optical source based on electrical to optical modulation.

9. The non-transitory, machine-readable medium of claim 1, wherein a bandwidth of energy associated with the first sequence of electrical signals, the second sequence of electrical signals and the third sequence of electrical signals are greater than 10 GHz, wherein the first sequence of electrical signals, the second sequence of electrical signals and the third sequence of electrical signals are composed of distinct subcarriers carrying dependent or independent sequences or subsequences which are then processed by the plurality of matched filters.

10. The non-transitory, machine-readable medium of claim 1, wherein the first sequence of electrical signals, the second sequence of electrical signals and the third sequence of electrical signals are composed of distinct wavelengths carrying dependent or independent sequences or subsequences which are then processed by the plurality of matched filters, wherein the first sequence of optical signals, the second sequence of optical signals and the adjusted sequence of optical signals travel through air.

11. The non-transitory, machine-readable medium of claim 1, wherein the converting the second sequence of optical signals into the second sequence of electrical signals is performed by a detector with greater than 50 GHz bandwidth, and wherein the detector is an intensity detector.

12. The non-transitory, machine-readable medium of claim 1, wherein the converting of the second sequence of optical signals to the second sequence of electrical signals is performed with a coherent detector, wherein the coherent detector uses a portion of the CW optical source as a local oscillator or another CW optical source as a local oscillator.

13. The non-transitory, machine-readable medium of claim 1, wherein the processing of the second sequence of electrical signals comprises performing an analog-to-digital conversion and digital signal processing, wherein at least a portion of the digital signal processing is performed in an ASIC or an FPGA, wherein the processing comprises a correlation of the first sequence of electrical signals and the second sequence of electrical signals with a fixed-length matched filter.

14. The non-transitory, machine-readable medium of claim 1, wherein the extracted information includes absorption, delay, orientation, polarization, or combinations thereof, wherein the extracted information is used to determine features of the plurality of objects, the features including range, velocity, acceleration, or combinations thereof, and wherein sequences of symbols associated with the third sequence of electrical signals is generated based on at least a portion of the extracted information.

15. The non-transitory, machine-readable medium of claim 1, wherein the third sequence of electrical signals is composed of symbol sequences that have different electrical power relative to other sequences associated with the first sequence of electrical signals, wherein the symbol sequences are orthogonal to other sequences of symbols associated with the first sequence of electrical signals, wherein a first symbol rate of the first sequence of electrical signals differs from a third symbol rate associated with the third sequence of electrical signals, wherein a total length in a first number of symbols of the first sequence of electrical signals differs from a third number of symbols associated with the third sequence of electrical signals.

16. The non-transitory, machine-readable medium of claim 1, wherein a first length of first orthogonal sequences of the first sequence of electrical signals differs from a third length of third orthogonal sequences associated with the third sequence of electrical signals, wherein taps in the plurality of matched filters used for correlation are adapted to match the first sequence of electrical signals, the third sequence of electrical signals, or combinations thereof in an iterative fashion.

17. The non-transitory, machine-readable medium of claim 1, wherein a collection of points in the plurality of objects correspond to a point cloud, wherein the first feature of the plurality of objects corresponds to a first set of points in the point cloud, wherein the second feature of the plurality of objects corresponds to a second set of points in the point cloud, wherein the first adjustment to the characteristics of the first portion of optical signals refines identification of the first set of points in the point cloud, and wherein the second adjustment to the characteristics of the second portion of optical signals refines identification of the second set of points in the point cloud.

18. The non-transitory, machine-readable medium of claim 1, wherein the first adjustment includes adjusting a first sequence of symbols of the first portion of optical signals, wherein the second adjustment includes adjusting a second sequence of symbols of the second portion of optical signals, and wherein the first sequence of symbols differs from the second sequence of symbols.

19. A method, comprising:
creating, by circuitry, a first sequence of optical signals based on a first sequence of electrical signals supplied to a continuous-wave (CW) optical source, the first sequence of electrical signals associated with a plurality of matched filters, wherein a first portion of optical signals in the first sequence of optical signals is directed to a first feature of a plurality of objects, wherein a second portion of optical signals in the first sequence of optical signals is directed to a second feature of the plurality of objects, wherein characteristics of the first portion of optical signals are adjusted differently from characteristics of the second portion of optical signals;
directing, by the circuitry, the first sequence of optical signals to the plurality of objects;
receiving, by the circuitry, a second sequence of optical signals based on a reflection of the first sequence of optical signals on the plurality of objects;
converting, by the circuitry, the second sequence of optical signals into a second sequence of electrical signals;
processing, by the circuitry, the second sequence of electrical signals according to the plurality of matched filters to extract information associated with the plurality of objects to identify the first feature and the second feature of the plurality of objects;
adjusting, by the circuitry, the first sequence of electrical signals to a third sequence of electrical signals;
adjusting, by the circuitry, the plurality of matched filters according to the third sequence of electrical signals;
applying, by the circuitry, the third sequence of electrical signals to the CW optical source to produce an adjusted sequence of optical signals, the adjusted sequence of optical signals including a first adjustment to the characteristics of the first portion of optical signals and a second adjustment to the characteristics of the second portion of optical signals with the first adjustment differing from the second adjustment; and
directing, by the circuitry, the adjusted sequence of optical signals to further refine the identification of the first feature and the second feature of the plurality of objects.

20. The method of claim 19, wherein the directing of the adjusted sequence of optical signals occurs within a period of receiving the second sequence of optical signals.

21. A device, comprising:
circuitry that facilitates performance of operations, comprising:
creating a first sequence of optical signals based on a first sequence of electrical signals supplied to a continuous-wave (CW) optical source, the first sequence of electrical signals associated with a plurality of matched filters, wherein a first portion of optical signals in the first sequence of optical signals is directed to a first feature of a plurality of objects, wherein a second portion of optical signals in the first sequence of optical signals is directed to a second feature of the plurality of objects, and wherein characteristics of the first portion of optical signals are adjusted differently from characteristics of the second portion of optical signals,
directing the first sequence of optical signals to the plurality of objects,
receiving a second sequence of optical signals based on a reflection of the first sequence of optical signals on the plurality of objects,
converting the second sequence of optical signals into a second sequence of electrical signals,
processing the second sequence of electrical signals according to the plurality of matched filters to extract information associated with the plurality of objects to identify the first feature and the second feature of the plurality of objects, adjusting the first sequence of electrical signals to a third sequence of electrical signals, adjusting the plurality of matched filters according to the third sequence of electrical signals, applying the third sequence of electrical signals to the CW optical source to produce an adjusted sequence of optical signals, the adjusted sequence of optical signals including a first adjustment to the characteristics of the first portion of optical signals and a second adjustment to the characteristics of the second portion of optical signals with the first adjustment differing from the second adjustment, and directing the adjusted sequence of optical signals to further refine the identification of the first feature and the second feature of the plurality of objects.

22. The device of claim 21, wherein the adjusting of the first sequence of electrical signals to the third sequence of electrical signals is based on the extracted information, wherein the adjusting the plurality of matched filters according to the third sequence of electrical signals is based on the extracted information, and wherein the adjusted sequence of optical signals is directed to the plurality of objects subsequent to a completion of the first sequence of optical signals.

\* \* \* \* \*